(No Model.)
W. C. ANDREWS.
PROCESS OF PURIFYING GAS.
No. 426,093. Patented Apr. 22, 1890.
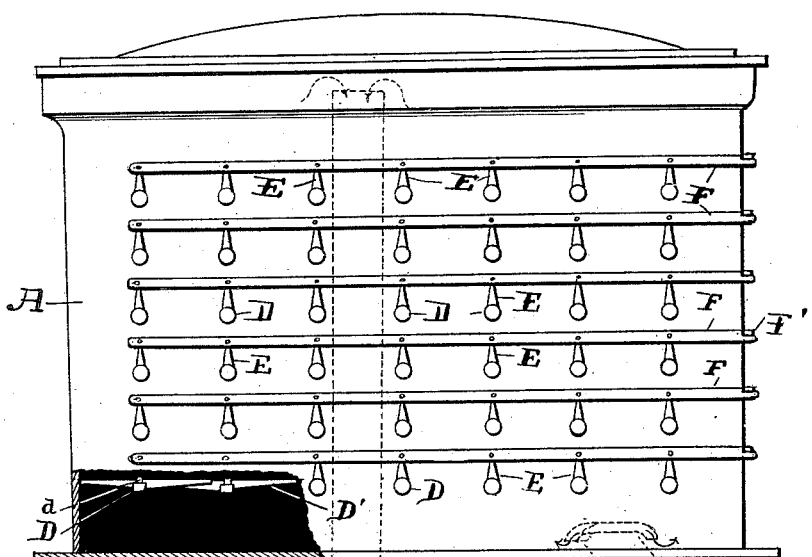
Fig. 1.
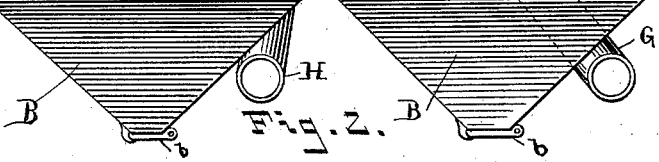
Fig. 2.
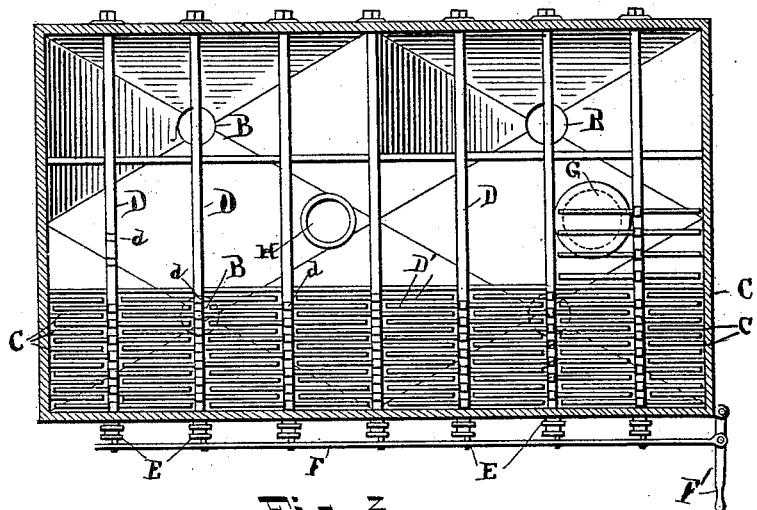
Fig. 3.
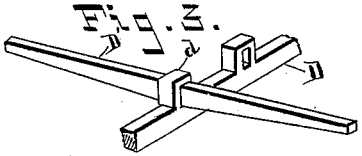
Witnesses
David H Mead
J B Keefer
Inventor,
Wallace C. Andrews.
by R. S. Dyrenforth
his Attorney

UNITED STATES PATENT OFFICE.

WALLACE C. ANDREWS, OF NEW YORK, N. Y.

PROCESS OF PURIFYING GAS.

SPECIFICATION forming part of Letters Patent No. 426,093, dated April 22, 1890.

Application filed September 19, 1888. Serial No. 285,822. (No model.)

*To all whom it may concern:*

Be it known that I, WALLACE C. ANDREWS, a citizen of the United States, residing at New York, in the county of New York and State of New York, have invented certain new and useful Improvements in Processes of Purifying Gas; and I do hereby declare the following to be a full, clear, and exact description of the invention, such as will enable others skilled in the art to which it appertains to make and use the same.

This invention relates to the purification of illuminating and heating gas.

Heretofore in the purification of gas the gas has either been led over solid purifying material lying quiescent in a compact body or has been passed through such. In the former case the purifying material soon becomes coated superficially by a product or by products, absolutely inert so far as purification is concerned, formed with the purifying material by a substance or by substances chemically separated from the crude gas and soon becomes fouled superficially by deposits therefrom, while in the latter case the purifying material soon becomes coated and fouled internally by the same means, the gas making channels and these channels becoming lined with the inert product or products and with the deposits. In either case perfect purification soon ceases, allowing much of the impurities of the gas to pass on, and in both cases the great bulk of the purifying material employed is kept from operation. The only remedy has been, at necessity of stoppage of the current of gas or deflection of the same to another purifier and at great expenditure of labor and loss of time, either frequently to supply new purifying material or to turn or stir up the old to present new surfaces. The gas has also been passed through a shower of lime-water; but wet purifiers are troublesome, and the gas has subsequently to be dried.

The objects of the present invention are to overcome these difficulties, to make the operation continuous, and thoroughly and directly to purify gas in a simple, practical, efficient, and comparatively inexpensive manner.

With these objects in view the invention resides in the process of purifying gas, which consists in passing the gas in contact with and through solid purifying material in a state of agitation or through a shower or stream of purifying material in a finely-divided condition, whereby the active surface of the purifying material is greatly increased, the entire body of purifying material present at any one time is offered for action upon the gas, and new surfaces are constantly presented; furthermore, the invention resides in the process of purifying gas, which consists in passing the gas through a body of purifying material alternately in a state of rest and under agitation; and, finally, the invention resides in a process of purifying gas, which consists in passing the gas through successive layers of purifying material and moving the layers progressively against the gas, discharging the last layer as spent, and resupplying fresh material at will.

It is obvious that my invention may be carried into effect in many different ways, and I do not wish to be understood as being confined to any specific form of embodiment in this application; but in the accompanying drawings I show a form of apparatus which will serve to illustrate the operation of the invention.

The particular apparatus shown is not herein claimed, since the same forms the subject of another application, filed August 13, 1888, and bearing Serial No. 282,500.

In the accompanying drawings, in which like letters of reference indicate corresponding parts, Figure 1 is a side elevation of a gas-purifying apparatus capable of carrying my invention into effect, with a portion of the side broken away to show some of the interior parts. Fig. 2 is a plan view of the apparatus with the top removed, and Fig. 3 is a perspective view of one of the details of construction.

In the exercise of my invention lime or other suitable purifying material may be agitated or caused to move vertically, horizontally, or in any other direction in a closed compartment, through which gas to be purified is passed. The purifying material may move in the compartment in one or more streams or showers, either simultaneously or in sequence, or may be agitated in bulk, and the agitation and showering may be simultaneous.

In the illustrations which I give in the accompanying drawings the purifying material is placed in several separate layers within a casing, and all the layers may be caused gradually to fall simultaneously, or one or the other may be caused to take a lower position, the falling being effected by the construction of the support upon which the layer rests and by agitation, and the gas may be caused to pass up through or across the showers, or alternately across or through a shower and through a body of purifying material.

In the drawings, A designates a casing, the bottom of which is formed with hoppers B B, closed by a valve $b$. At each end of the casing, and within the same, are rigidly attached rows of slats or arms C, placed in tiers, the tiers being of suitable distance apart, and across the casing are rows of horizontal shafts D D, likewise placed in tiers and nearly in horizontal plane, respectively, with the rows of rigid arms C. Each shaft D is provided with a series of transverse eyes, apertured lugs, or loops $d$, and in these eyes are held series of movable arms, slats, or cross-pieces D' D'. The shafts D are provided with cranks or other devices E, and to the cranks of each row of shafts are attached rods F, which may have levers F' for operating them. It will be clear that as one of these rods F is moved by its lever all the shafts of that particular row will be rocked, and as the shafts are rocked the movable arms will be oscillated. Each row of shafts may be rocked separately or their rods may be so connected as to rock two or more of them simultaneously. When movable arms or cross-pieces D' are in a horizontal position, they are in the same horizontal plane with the fixed arms C, and the outer portions of the arms of the outer shafts form with the fixed arms and the inner portions of the arms of the outer shafts form with the outer portions of the arms of the adjoining shafts, and so on mutually in each row, a grating or open platform to support a layer of the purifying material.

The gas-inlet pipe is designated by the letter G, while the gas-outlet pipe is designated by the letter H. The gas-outlet pipe is of course beyond the first layer of purifying material.

It is preferred to have the horizontal shafts in each row about two and one-half feet apart, and to have the movable arms slightly less than five feet in length, with about an inch and a half space between adjoining strips.

The operation is as follows: Gas entering the lower part of the casing passes upward through the lower layer of purifying material, and so on to the outlet. Either continually or when the passing gas is recognized by suitably-situated petcocks to be wanting in requisite purity, one, more, or all of the rows of shafts will be rocked, and the purifying material will be agitated and fall in a shower or stream to trap the appropriate impurities of the gas. Fresh purifying material is supplied from the top, as desired, and thus successive layers are fed forward. It will be obvious that the lowest layer of purifying material will first become inert and foul, since this layer is first met by the crude gas and is supplied from the other layers, all of which have exerted a purifying effect. Consequently this layer will be dumped into the hoppers and thence may be removed at convenience. Should it be desired to leave the purifying material quiescent during the passage of the gas, the bottom layer of purifying material will be discharged into the hoppers, when it becomes saturated with impurities, the shafts D D being rocked or shaken for that purpose; but the bottom layer may first be disposed of, and then the shafts of all the other layers being rocked, each layer of purifying material will be lowered, and, this done, a fresh layer of material will be supplied at the top. By this operation a great saving of labor is effected, and a much larger quantity of gas than usual can be purified in proportion to the ground-space occupied, since not only is a great quantity of material immediately presented in active form, but as the tiers of purifying material may be in any number and be successively discharged, a purifier may be of great height, thus taking the place of many separate purifiers.

Having thus fully described my invention, what I claim as new, and desire to secure by Letters Patent, is—

1. The process of purifying gas, which consists in passing the gas upwardly through a body of solid purifying material, the purifying material being alternately at rest, and moving in a shower progressively downward during the passage of the gas, substantially as described.

2. The process of purifying gas, which consists in passing the gas upwardly through successive layers of solid purifying material, and moving the layers in a shower progressively against the gas, discharging the last layer as spent, and resupplying fresh material at will, substantially as described.

In testimony whereof I affix my signature in presence of two witnesses.

WALLACE C. ANDREWS.

Witnesses:
LEWIS COON,
GEO. BEITH, Jr.